United States Patent
Engel et al.

(10) Patent No.: US 10,606,480 B2
(45) Date of Patent: Mar. 31, 2020

(54) SCALE-OUT CONTAINER VOLUME SERVICE FOR MULTIPLE FRAMEWORKS

(71) Applicant: INTERNATIONAL BUSINESS MACHINES CORPORATION, Armonk, NY (US)

(72) Inventors: Robert Engel, San Francisco, CA (US); Dean Hildebrand, Bellingham, WA (US); Nagapramod Mandagere, San Jose, CA (US); Mohamed Mohamed, San Jose, CA (US); Amit S. Warke, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/785,474

(22) Filed: Oct. 17, 2017

(65) Prior Publication Data
US 2019/0114081 A1 Apr. 18, 2019

(51) Int. Cl.
*G06F 9/455* (2018.01)
*G06F 9/50* (2006.01)
*G06F 3/06* (2006.01)

(52) U.S. Cl.
CPC .......... *G06F 3/0605* (2013.01); *G06F 3/0661* (2013.01); *G06F 9/455* (2013.01); *G06F 9/45558* (2013.01); *G06F 9/5077* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS

| 9,110,757 B2 | 8/2015 | Tian et al. |
| 9,250,827 B2 | 2/2016 | Beveridge |
| 2015/0199354 A1 | 7/2015 | Jernigan, IV et al. |

(Continued)

FOREIGN PATENT DOCUMENTS

CN 105025095 A 11/2015

OTHER PUBLICATIONS

"Kubernetes, Concepts: Volumes", printed on Oct. 2, 2017 and cited in Applicant's IDS filed on Oct. 17, 2017 (Year: 2017).*

(Continued)

*Primary Examiner* — Daxin Wu
(74) *Attorney, Agent, or Firm* — Anthony M. Pallone

(57) ABSTRACT

An embodiment of the invention may include a method, computer program product and system for data storage management. The embodiment may include receiving a request from a second container runtime for access to a first container runtime volume by the second container runtime. The embodiment may include determining whether the first container runtime volume exists within a shared unified volume listing. Based on determining that the first container runtime volume exists within the shared unified volume listing, the embodiment may include transforming volume information of the first container runtime volume from a unified volume listing schema to a second container runtime volume listing schema. The embodiment may include returning the volume information of the first container runtime volume to the second container runtime.

17 Claims, 6 Drawing Sheets

(56) References Cited

U.S. PATENT DOCUMENTS

| 2015/0378624 | A1  | 12/2015 | Choudhary et al. |
| 2016/0162209 | A1  | 6/2016  | Calderone et al. |
| 2016/0359955 | A1  | 12/2016 | Gill et al. |
| 2017/0199770 | A1* | 7/2017  | Peteva ................. G06F 9/5088 |
| 2018/0267990 | A1* | 9/2018  | Cherukuri ............. G06F 8/60 |

OTHER PUBLICATIONS

Kubernetes, "Concepts: Volumes", Printed on Oct. 2, 2017, 25 Pages, https://kubernetes.io/docs/concepts/storage/volumes/.

Docker Documentation, "Use Docker Engine Plugins", Printed on Oct. 2, 2017, 3 Pages, https://docs.docker.com/engine/extend/legacy_plugins/.

Mell et al., "The NIST Definition of Cloud Computing", NIST, Sep. 2011, pp. 1-3, Special Publication 800-145, U.S. Department of Commerce, Gaithersburg, MD.

* cited by examiner

SCALE-OUT CONTAINER VOLUME SERVICE FOR MULTIPLE FRAMEWORKS

BACKGROUND

The present invention relates, generally, to the field of cloud computing, and more specifically, to implementing a shared storage across multiple container frameworks.

Operating-system-level virtualization, also known as containerization, refers to an operating system feature in which the kernel allows the creation of multiple isolated user-space environments, called containers. A container is a lightweight, stand-alone, executable package of a piece of software that includes everything needed to run it (i.e., code, runtime, system tools, system libraries, settings, etc.). A computer program running on a typical computer can see all resources (e.g., connected devices, files and folders, network shares, CPU power, and other quantifiable hardware capabilities) of that computer. However, a computer program running inside a container can only see the container's contents and devices assigned to the container.

BRIEF SUMMARY

An embodiment of the invention may include a method, computer program product and system for data storage management. The embodiment may include receiving a request from a second container runtime for access to a first container runtime volume by the second container runtime. The embodiment may include determining whether the first container runtime volume exists within a shared unified volume listing. Based on determining that the first container runtime volume exists within the shared unified volume listing, the embodiment may include transforming volume information of the first container runtime volume from a unified volume listing schema to a second container runtime volume listing schema. The embodiment may include returning the volume information of the first container runtime volume to the second container runtime.

DETAILED DESCRIPTION

Figure 1:
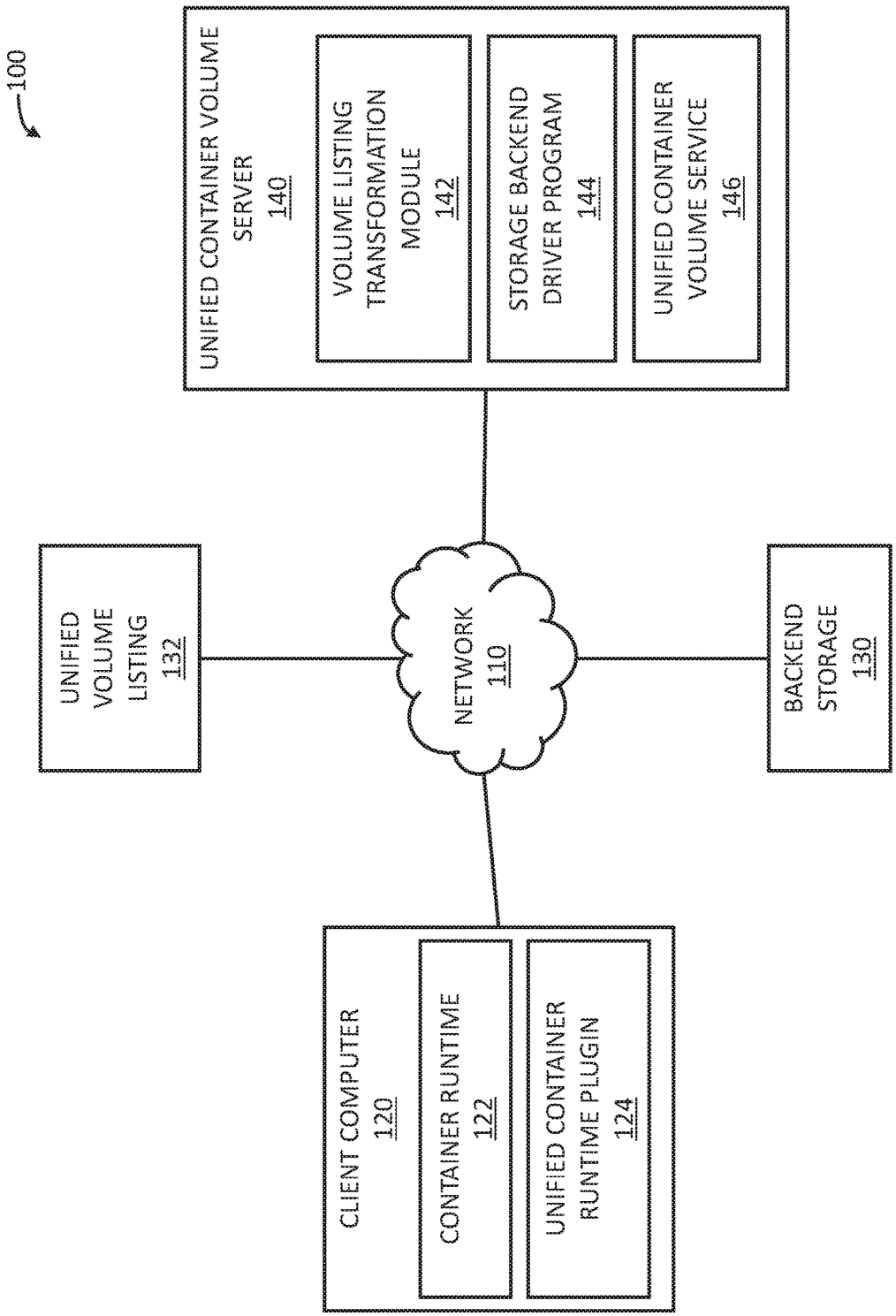
FIG. 1 is a block diagram illustrating a unified container volume service system, in accordance with an embodiment of the present invention.

As mentioned above, a container is a logical environment, created on a computer, in which an application can run. The container, and any application within the container, are abstracted from the underlying host computer's hardware resources (e.g., processors, memory, storage, etc.) and are logically isolated from other containers. Containers are supported by the underlying operating system of the host computer and share the same operating system kernel. The container host provides each container with a virtualized space that grants access only to the resources the container should see. In doing so, the container behaves as if it is the only application running on the system. The container host also controls how much of its resources are available for use by individual containers. A container is deployed via a container image which is a file that represents a combination of application, data, operating system libraries, and all other dependencies needed to execute the application. Once deployed to a host computer with a compatible container platform (e.g., Docker®), the containerized application will run without the need to install or update any other components on the host computer. This behavior provides a standard way to package a software application with all its dependencies and makes containers portable between environments.

Several known container frameworks/runtimes are available as a cloud service in the industry, for example, Docker®, Kubernetes®, and Cloud Foundry®. Each container runtime enables users to make effective use of the above-mentioned mechanisms by providing their own application programming interface ("API") and tooling that abstract the low level technical details. For example, a RESTful API, which is based on representational state transfer (REST) technology and is often used in web services development. A RESTful API uses HTTP requests to GET, PUT, POST, and DELETE data. REST leverages less bandwidth, making it more suitable for internet usage. As cloud uses increase, APIs are used to expose web services and REST is a logical choice for building APIs that allow users to connect and interact with cloud services. Utilizing REST, networked components are a resource users request access to.

Furthermore, each container runtime requires persistent storage (volumes) and each container runtime provides its own mechanisms for integrating and tracking volumes. Consequently, implementing multiple container runtimes, each accessing a single piece of data or dataset, results in multiple, per-runtime volume listings and multiple storage systems. What is lacking is a single storage location with a definitive volume list. As such, it may be advantageous to, among other things, implement a system capable of providing unified data access across multiple container runtimes. Such a system may support multiple container frameworks and multiple storage systems, so that storage volumes, created by individual container frameworks, can be shared across all container frameworks and stored in a single repository.

Embodiments of the present invention may include a unified container volume service ("UCVS") system 100, described below, which provides a method for implementing a unified shared storage environment across container frameworks. UCVS system 100 may create a shared database for storing and accessing multiple container volumes and maintain a complete container volume listing. UCVS system 100 may also implement a host computer plugin, storage driver, and a REST API to handle container runtime requests to create a volume, delete a volume, or otherwise access the shared database.

Embodiments of the present invention will now be described in detail with reference to the accompanying Figures.

FIG. 1 is a functional block diagram illustrating unified container volume service system 100, in accordance with an embodiment of the present invention. In an example embodiment, unified container volume service system 100 may include client computer 120, backend storage 130, unified volume listing 132, and unified container volume server 140, all interconnected via network 110.

In various embodiments, network 110 is a communication channel capable of transferring data between connected devices. In an example embodiment, network 110 may be the Internet, representing a worldwide collection of networks and gateways to support communications between devices connected to the Internet. Moreover, network 110 may include, for example, wired, wireless, or fiber optic connections which may be implemented as an intranet network, a local area network (LAN), a wide area network (WAN), or any combination thereof. In further embodiments, network 110 may be a Bluetooth network, a WiFi network, or a combination thereof. In general, network 110 can be any combination of connections and protocols that will support communications between client computer 120, backend storage 130, unified volume listing 132, and unified container volume server 140.

In an example embodiment, client computer 120 may include container runtime 122 and unified container runtime plugin 124. Client computer 120 may be a laptop computer, a notebook, a tablet computer, a netbook computer, a personal computer (PC), a desktop computer, a personal digital assistant (PDA), a smart phone, a mobile phone, a virtual device, a thin client, or any other electronic device or computing system capable of receiving and sending data from and to other computing devices such as unified container volume server 140, via network 110, and capable of supporting a container runtime (e.g., Docker®) and the functionality required of embodiments of the invention. While client computer 120 is shown as a single device, in other embodiments, client computer 120 may be comprised of a cluster or plurality of computing devices, working together or working separately. Client computer 120 may be described generally with respect to FIG. 4 below.

In an example embodiment, container runtime 122 may be a program, or subroutine contained in a program, that may operate to implement a container on client computer 120 in response to actions of a user of client computer 120. Container runtime 122 may result from any commercially available, open source, or proprietary software (e.g., Docker®, Kubernetes®, Cloud Foundry®) that packages and deploys virtualized application containers on a common operating system, in accordance with embodiments of the invention. In response to user actions, container runtime 122 may send a request to create, delete, or otherwise access a volume listing, in accordance with embodiments of the invention. In an example embodiment, container runtime 122 sends a request, to unified container runtime plugin 124, to create a container runtime volume, in response to a user action.

In an example embodiment, unified container runtime plugin 124 may be a program, or subroutine contained in a program, that may operate to facilitate communications between a container runtime on a host computer system (e.g., container runtime 122) and unified container volume service 146. Unified container runtime plugin 124 may handle requests (e.g., create volume, delete volume, and access volume), received from container runtime 122, by routing them to unified container volume service 146, via network 110. Unified container runtime plugin 124 may also operate to handle storage specific operations that are local to client computer 120, for example, mounting the file system in which a storage volume (e.g., a volume specific to container runtime 122) exists. In another embodiment, unified container runtime plugin 124 may further operate to link to multiple container frameworks on a host computer system (e.g., client computer 120) by allowing access across multiple container frameworks, via unified container volume service 146, to a data volume listing stored on unified volume listing 132. In an example embodiment, unified container runtime plugin 124 receives a request, from container runtime 122, to create a container volume and transmits, via network 110, the request to unified container volume service 146.

In an example embodiment, backend storage 130 may be a desktop computer, a notebook, a laptop computer, a blade server, a networked computer appliance, a virtual device, a thin client, or any other networked electronic device or computing system capable of receiving and sending data from and to other computing devices such as client computer 120, unified volume listing 132, and unified container volume server 140, via network 110, and capable of supporting the functionality required of embodiments of the invention. In an example embodiment, backend storage 130 may implement a shared file system accessible by other computing devices, such as client computer 120 and unified container volume server 140, via network 110. Furthermore, in an example embodiment, backend storage 130 may store data volumes created by UCVS system 100. While backend storage 130 is shown as a single device, in other embodiments, backend storage 130 may be comprised of a cluster or plurality of computing devices, working together or working separately. Backend storage 130 may be described generally with respect to FIG. 4 below.

In an example embodiment, unified volume listing 132 may be a database containing a complete volume listing of volumes accessed by container runtimes within UCVS system 100. Unified volume listing 132 may also contain volume specific information for volumes created by container runtimes within UCVS system 100 and stored within unified volume listing 132. Furthermore, unified volume listing 132 may also contain the set of container runtimes (e.g., container runtime 122) that are authorized to access the container volumes and volume listing stored within unified volume listing 132. In an embodiment, unified volume listing 132 may be stored as a database in the shared file system of backend storage 130. In various other embodiments, unified volume listing 132 may be implemented as a plain-text file or a key-value store.

In an example embodiment, unified container volume server 140 may include volume listing transformation module 142, storage backend driver program 144, and unified container volume service 146. Unified container volume server 140 may be a desktop computer, a notebook, a laptop computer, a blade server, a networked computer appliance, a virtual device, a thin client, or any other networked electronic device or computing system capable of receiving and sending data from and to other computing devices such as client computer 120, unified volume listing 132, and backend storage 130, via network 110, and capable of supporting the functionality required of embodiments of the invention. While unified container volume server 140 is shown as a single device, in other embodiments, unified container volume server 140 may be comprised of a cluster or plurality of computing devices, working together or working separately. Unified container volume server 140 may be described generally with respect to FIG. 4 below.

In an example embodiment, volume listing transformation module 142 may be a program, or subroutine contained in a program. Volume listing transformation module 142 operates to transform a volume listing schema of a local container runtime (e.g., container runtime 122) to a unified volume listing schema which may subsequently be stored within unified volume listing 132. A volume listing schema represents the logical view of the volume listing and defines how data is organized within the volume listing. In an example embodiment, volume listing transformation module 142 may be called by unified container volume service 146, described below, to transform a volume listing schema from the schema of container runtime 122 to a unified volume listing schema which may be stored in unified volume listing 132. Furthermore, volume listing transformation module 142 may also be called by unified container volume service 146 to transform a unified volume listing schema to the volume listing schema of local container runtime (e.g., container runtime 122).

In an example embodiment, storage backend driver program 144 may be a program, or subroutine contained in a program, that may implement, within backend storage 130, the actual management (i.e., volume creation and volume deletion) of unified volumes within UCVS system 100. Storage backend driver program 144 may manage volumes within backend storage 130 in response to direction from unified container volume service 146. In an example embodiment, storage backend driver program 144 may be directed by unified container volume service 146, described below, to create a volume within backend storage 130.

In an example embodiment, unified container volume service 146 may be a program, or subroutine contained in a program, that may execute requests received from unified container runtime plugin 124. The requests may relate to performing, via volume listing transformation module 142 and storage backend driver program 144, some management function (e.g., volume access, volume creation, and volume deletion) within backend storage 130. In an example embodiment, unified container volume service 146 may receive a request from unified container runtime plugin 124 to create a volume, such as volume1, for container runtime 122. In response to the request, unified container volume service 146 may direct volume listing transformation module 142 to transform the volume information of volume1 from the schema of container runtime 122 to the unified volume schema. In furtherance of the example embodiment, unified container volume service 146 may then direct storage backend driver program 144 to create volume1 within backend storage 130. Furthermore, unified container volume service 146 may subsequently save the volume information for volume1 within unified volume listing 132 and determine the set of container runtimes (e.g., container runtime 122) that may access the updated volume information stored in unified volume listing 132. In an example embodiment, unified container volume service 146 may utilize REST technology. In another embodiment, unified container volume service 146 may receive a request from unified container runtime plugin 124 for access to volume1 by another container runtime other than container runtime 122. The operations and functions of unified container volume service 146 are described in further detail below with regard to FIG. 2 and FIG. 3.

Figure 2:
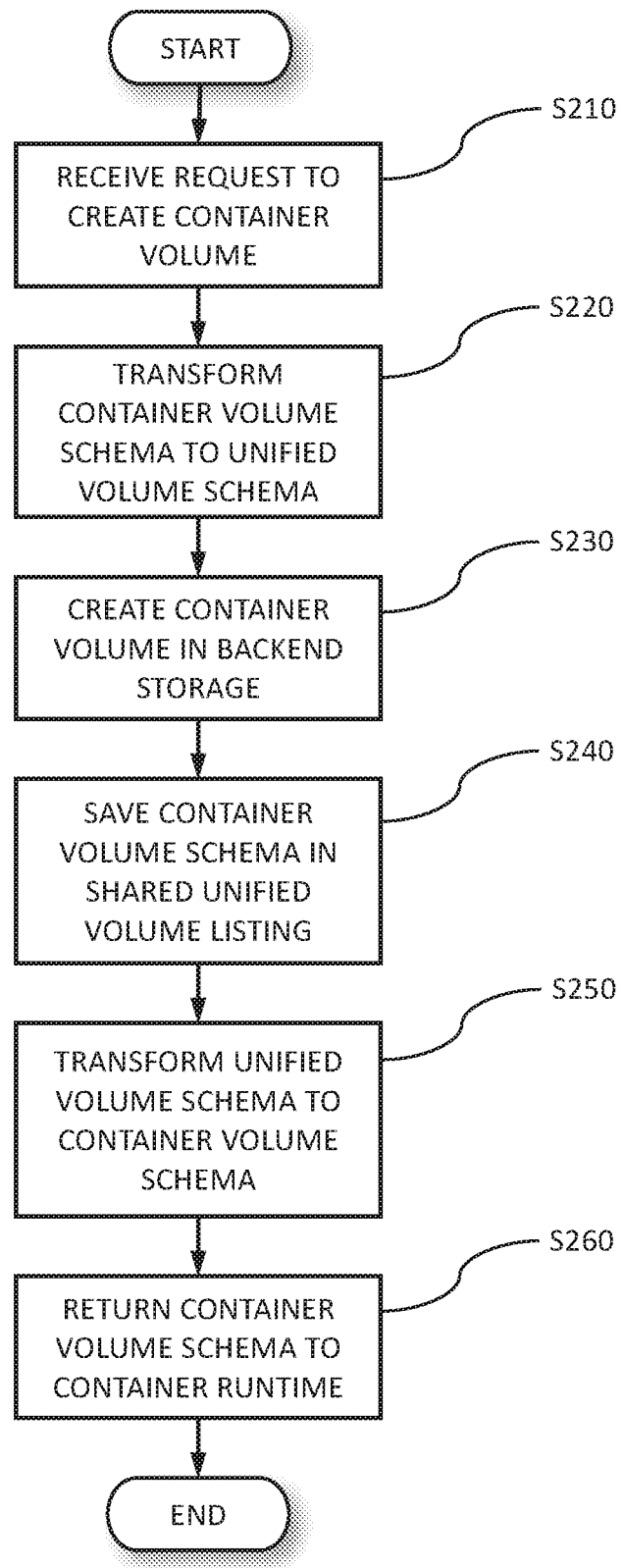
FIG. 2 is a flowchart illustrating the operations of the unified container volume service of FIG. 1, in accordance with an embodiment of the invention.

FIG. 2 shows a flowchart illustrating the operations of unified container volume service 146 in accordance with an example embodiment of the invention. Referring to step S210, unified container volume service 146 may receive, via network 110, a request from unified container runtime plugin 124. The received request may result from a user of client computer 120 calling upon container runtime 122 (e.g., Docker®, Kubernetes®, Cloud Foundry®), hosted on client computer 120, to perform some action (e.g., create a container volume). Container runtime 122 may route the requested action to unified container runtime plugin 124. Unified container runtime plugin 124 may then send, via network 110, the requested action to unified container volume service 146 for execution. In an example embodiment, unified container volume service 146 receives a request from unified container runtime plugin 124 to create a container volume, volume1, for container runtime 122.

Referring to step S220, unified container volume service 146 may call volume listing transformation module 142 as part of execution of the request received in step S210. Volume listing transformation module 142 may be directed, by unified container volume service 146, to transform the volume listing information of volume1 from the schema of container runtime 122 to a unified volume listing schema. In transforming the volume listing schema of volume1, a new empty volume listing entry, adherent to the unified volume listing schema, is created. Next, each attribute of container runtime 122's volume listing entry for volume1 is observed and assigned to its equivalent attribute in the unified volume listing entry according to a mapping between the two schemas. Container runtime volume listing attributes may include: volume name; capacity; file system type; metadata; and mount point. For this schema mapping, it is assumed that the unified volume listing schema contains an equivalent attribute for each attribute of any container runtime volume listing schema that UCVS system 100 supports. Transforming the schema of volume1 to the unified volume schema may allow the volume information of volume1 to be stored in unified volume listing 132 and potentially accessed by multiple container runtimes in addition to container runtime 122.

Referring to step S230, unified container volume service 146 may also call storage backend driver program 144 as part of execution of the request received in step S210. Unified container volume service 146 may utilize storage backend driver program 144 to perform the actual management of volumes within UCVS system 100. In an example embodiment, storage backend driver program 144 may execute the actual task of creating the container volume (i.e., volume1), for container runtime 122, within backend storage 130. In an example embodiment, storage backend driver program 144 may unlock access to backend storage 130 once it has created the container volume requested in step S210.

Referring to step S240, unified container volume service 146 may save the volume information of volume1, transformed in step S220, within unified volume listing 132. In saving the volume information, unified volume listing 132 may automatically create a lock file, restricting access to only one instance of unified container volume service (e.g. unified container volume service 146), in order to synchronize access to unified volume listing 132 among multiple instances of unified container volume service, if present. Unified volume listing 132 may also provide data storage synchronization among multiple container runtimes (e.g., container runtime 122) through centralizing the storage of a complete volume listing for multiple container runtimes. Unified container volume service 146 may also support various management features for container runtime volumes listed within unified volume listing 132. For example, unified container volume service 146 may permit a user to specify the type of allowable access methods (i.e., specifying an application layer network protocol) for accessing the container runtime volume listing within unified volume listing 132. Unified container volume service 146 may also permit a user to specify the type of container runtime (e.g., Docker®, Kubernetes®, Cloud Foundry®, etc.) which may access a container runtime volume within unified volume listing 132. Additionally, unified container volume service 146 may allow a user to perform actions concerning container runtime volumes within unified volume listing 132 such as, creation, deletion, updating, getting information, attach, and detach. Furthermore, unified container volume service 146 may permit a user to request an export file path so that a container runtime volume listed within unified volume listing 132 may be accessed a different container runtime. A user may also utilize unified container volume service 146 to implement custom features on container runtime volumes within unified volume listing 132 such as specifying storage type, access control lists, snapshots, QoS, etc.

Referring to step S250, unified container volume service 146 may, as part of execution of the request to create volume1 for container runtime 122, call volume listing transformation module 142 to transform the volume information of volume1 from the unified volume schema back to the schema of container runtime 122.

Referring to step S260, unified container volume service 146 may return the volume information of a newly created volume (e.g., volume1) to the container runtime (e.g., container runtime 122) which requested creation of the volume. In an example embodiment, unified container volume service 146 returns the volume information, transformed in step S250, of the newly created volume1 to container runtime 122, via network 110 and unified container runtime plugin 124.

Figure 3:
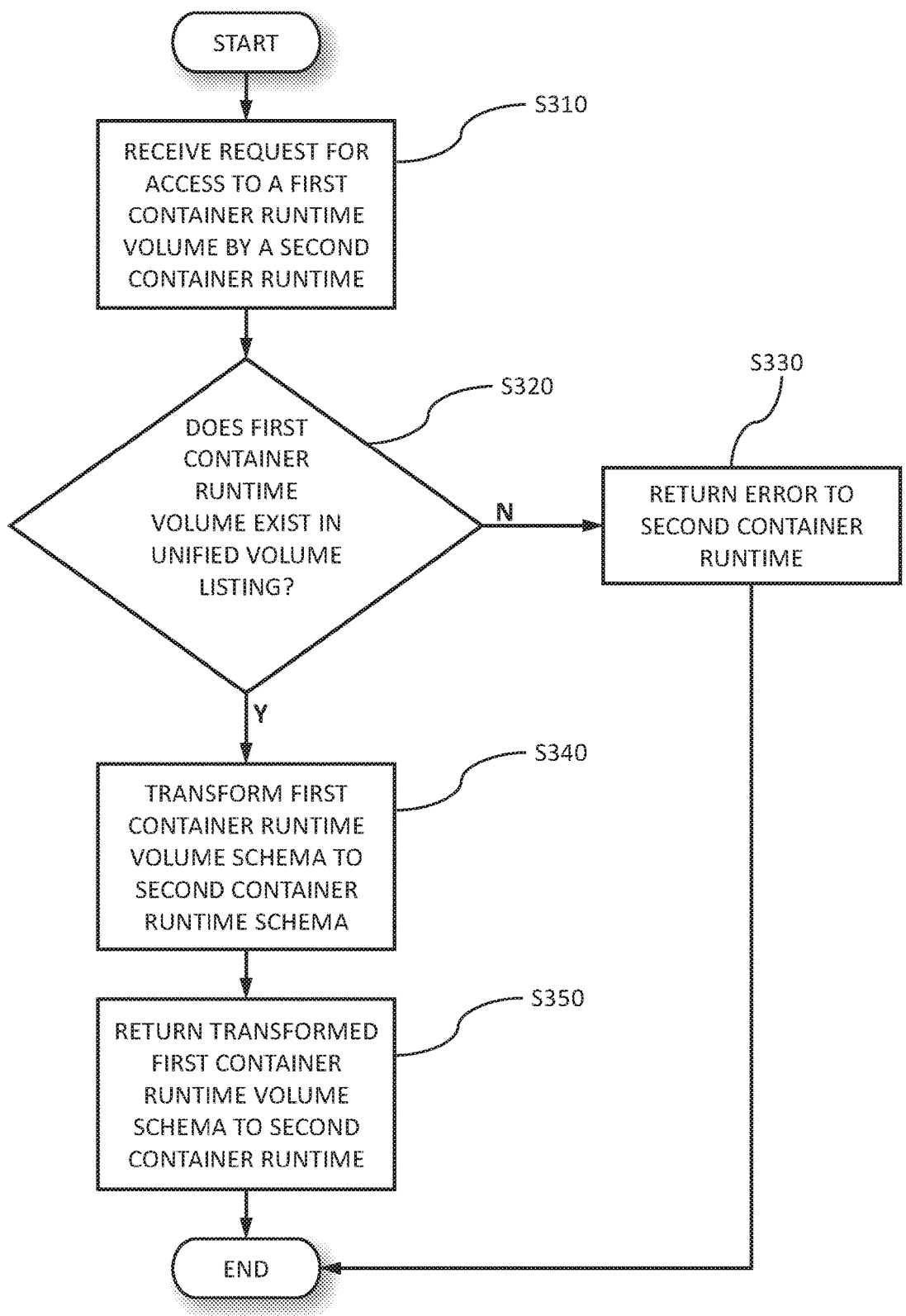
FIG. 3 is a flowchart illustrating the operations of the unified container volume service of FIG. 1, in accordance with another embodiment of the invention.

FIG. 3 shows a flowchart illustrating the operations of unified container volume service 146 in accordance with another embodiment of the invention. Referring to step S310, unified container volume service 146 may receive, via network 110, a request from unified container runtime plugin 124. The received request may result from a user of another container runtime, other than container runtime 122, requesting access to volume1, of container runtime 122, created in the example embodiment of FIG. 2. Container runtime 122 may route the requested action to unified container runtime plugin 124. Unified container runtime plugin 124 may then send, via network 110, the requested action to unified container volume service 146 for execution. In another embodiment, unified container volume service 146 receives a request from unified container runtime plugin 124 for access to volume1 by another container runtime other than container runtime 122.

Referring to step S320, unified container volume service 146 may determine whether the requested container volume exits within unified volume listing 132. In another embodiment, unified container volume service 146 determines if volume1 exists within unified volume listing 132. If unified container volume service 146 determines that volume1 exists within unified volume listing 132, unified container volume service 146 proceeds to step S340. If unified container volume service 146 determines that volume1 does not exist within unified volume listing 132, unified container volume service 146 proceeds to step S330. In another embodiment, unified container volume service 146 determines that volume1 exists within unified volume listing 132 and proceeds to step S340.

Referring to step S330, unified container volume service 146 may return an error message to the requesting container runtime of step S310 in response to determining that the requested volume does not exist within unified volume listing 132.

Referring to step S340, unified container volume service 146 may, as part of execution of the request for access to volume1 by another container runtime other than container runtime 122, call volume listing transformation module 142 to transform volume information from the unified volume schema to the schema of the requesting container runtime. In another embodiment, in response to determining that volume1 exists within unified volume listing 132, unified container volume service 146 utilizes volume listing transformation module 142 to transform the volume information of volume1 from the unified volume schema to the schema of the requesting container runtime.

Referring to step S350, unified container volume service 146 may return the volume information of a requested volume (e.g., volume1) to the requesting container runtime. In another embodiment, unified container volume service 146 returns the volume information, transformed in step S340, of volume1 to the requesting container runtime, via network 110 and unified container runtime plugin 124. This embodiment illustrates the ability of UCVS system 100 to make a data volume accessible to multiple container runtimes.

Figure 4:
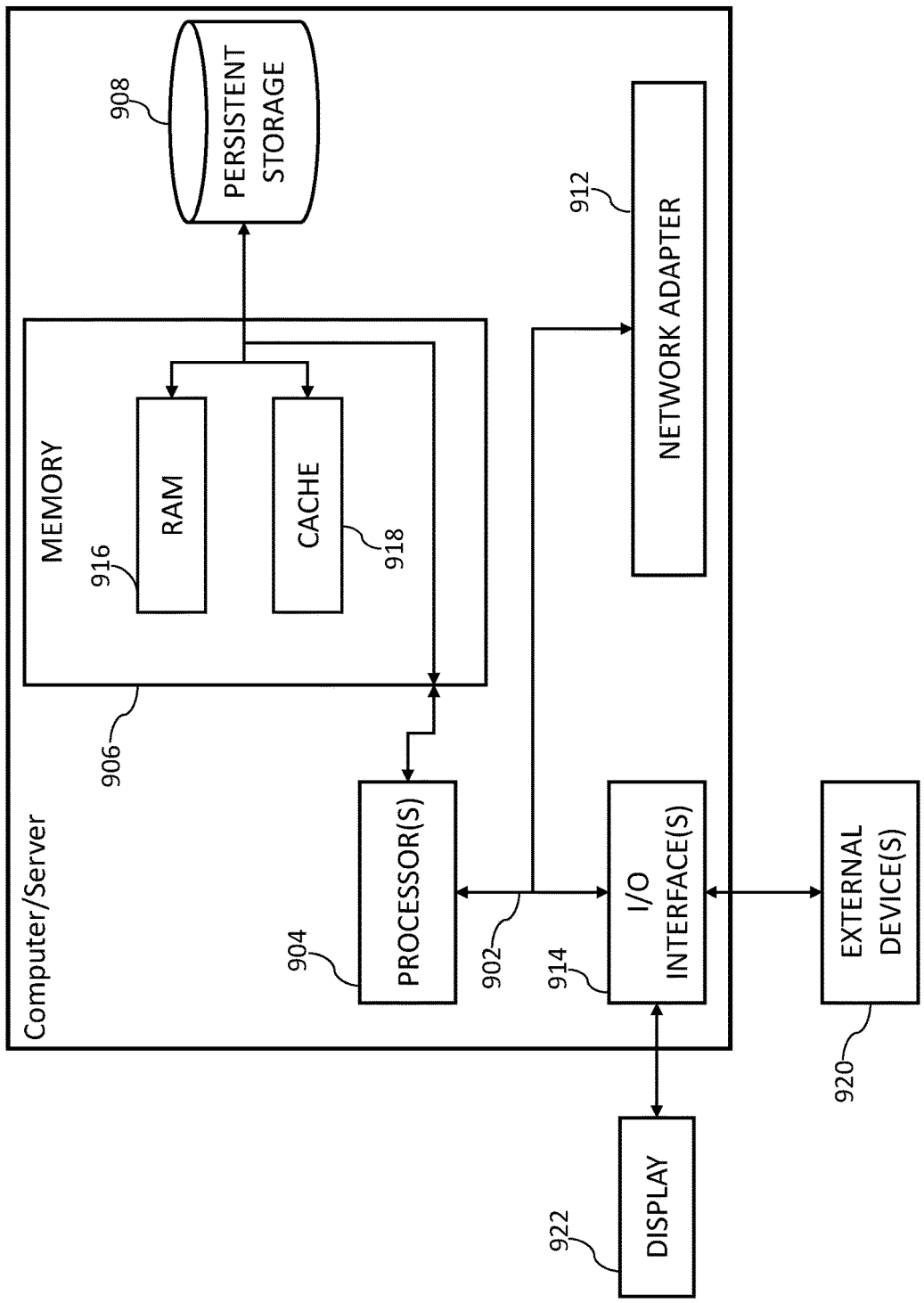
FIG. 4 is a block diagram depicting the hardware components of the unified container volume service system of FIG. 1, in accordance with an embodiment of the invention.

FIG. 4 depicts a block diagram of components of client computer 120, backend storage 130, and unified container volume server 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Client computer 120, backend storage 130, and unified container volume server 140 include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs container runtime 122 and unified container runtime plugin 124 in client computer 120; and volume listing transformation module 142, storage backend driver program 144, and unified container volume service 146 in unified container volume server 140 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs container runtime 122 and unified container runtime plugin 124 in client computer 120; and volume listing transformation module 142, storage backend driver program 144, and unified container volume service 146 in unified container volume server 140 may be downloaded to persistent storage 908 through network adapter 912.

I/O interface(s) 914 allows for input and output of data with other devices that may be connected to client computer 120, backend storage 130, and unified container volume server 140. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., programs container runtime 122 and unified container runtime plugin 124 in client computer 120; and volume listing transformation module 142, storage backend driver program 144, and unified container volume service 146 in unified container volume server 140, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
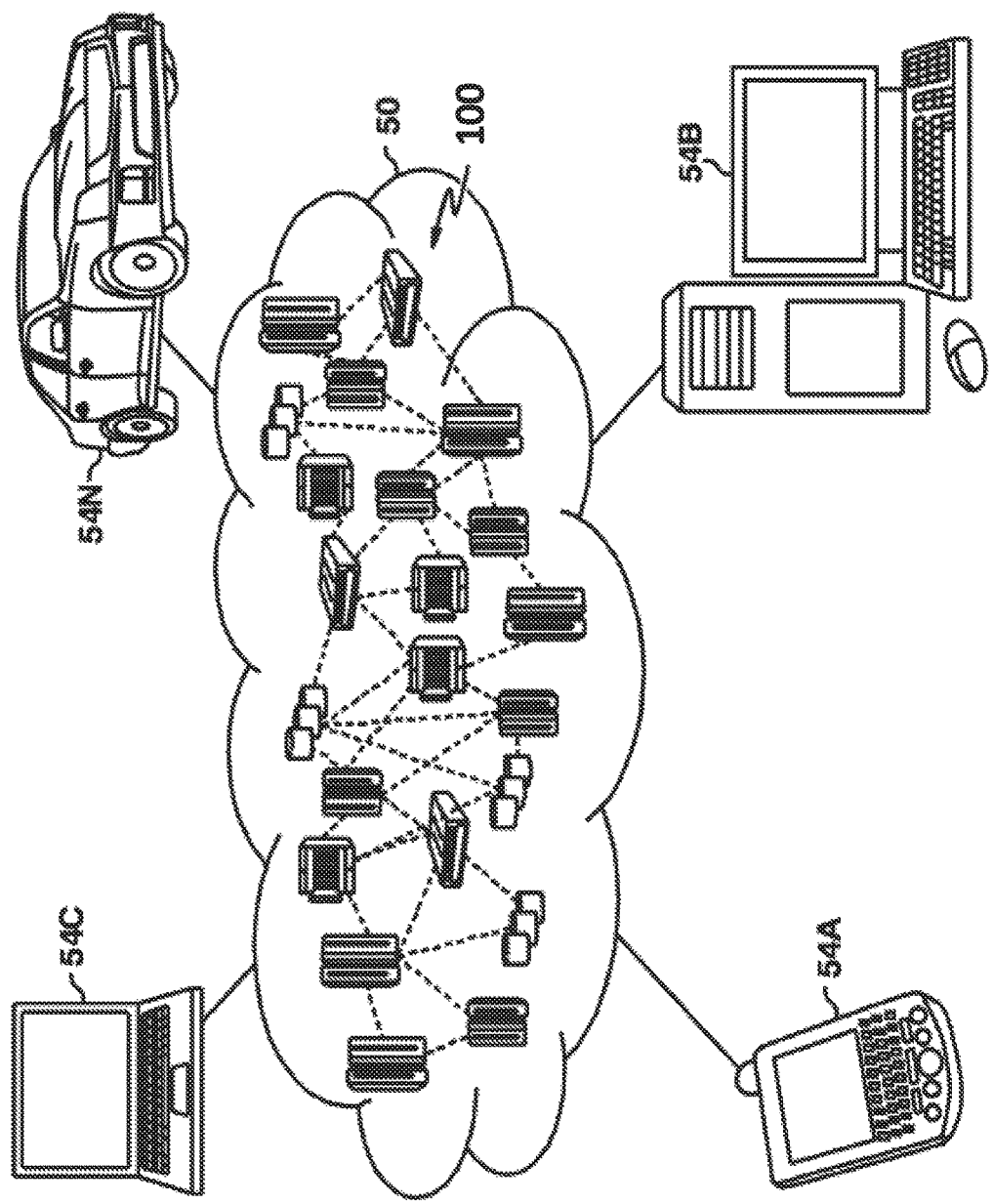
FIG. 5 depicts a cloud computing environment in accordance with an embodiment of the present invention.

Referring now to FIG. 5, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
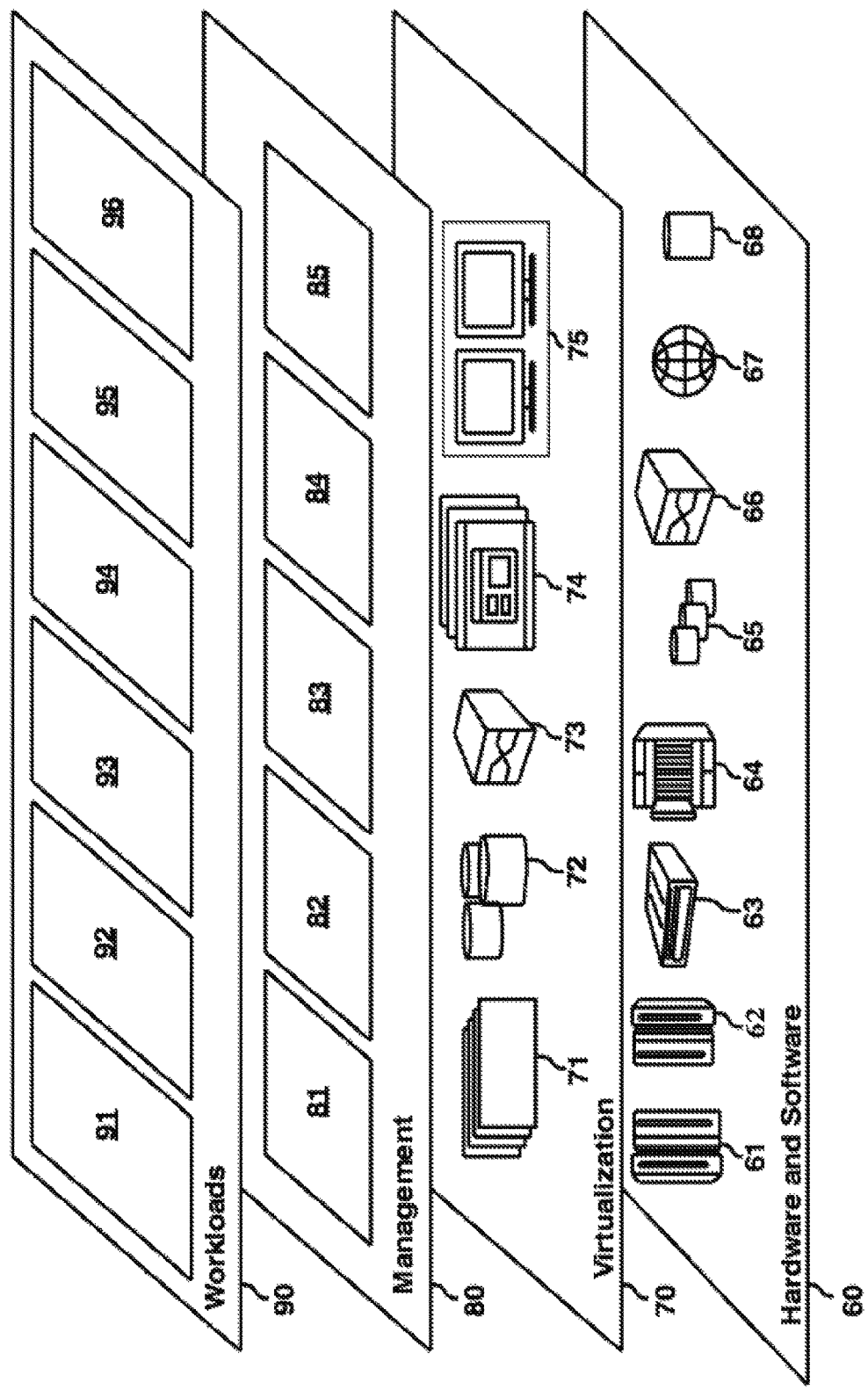
FIG. 6 depicts abstraction model layers in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and unified container volume service system 96. Unified container volume service system 96 may relate to implementing a shared storage across multiple container frameworks within a cloud computing environment.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A method for data storage management, the method comprising:
   receiving a request from a first container runtime to create a first container runtime volume;
   transforming volume information of the first container runtime volume from a first container runtime volume listing schema to a unified volume listing schema;
   creating the first container runtime volume within a backend storage;
   storing the unified volume listing schema for the first container runtime volume within a shared unified volume listing;
   transforming the volume information of the first container runtime volume from the unified volume listing schema to the first container runtime volume listing schema;
   returning the volume information of the first container runtime volume to the first container runtime;
   receiving a request from a second container runtime for access to the first container runtime volume by the second container runtime;
   determining whether the first container runtime volume exists within the shared unified volume listing;
   based on determining that the first container runtime volume exists within the shared unified volume listing, transforming the volume information of the first container runtime volume from the unified volume listing schema to a second container runtime volume listing schema; and
   returning the volume information of the first container runtime volume to the second container runtime.

2. The method of claim 1, wherein transforming the volume information of the first container runtime volume from the first container runtime volume listing schema to the unified volume listing schema comprises:

creating a new empty volume listing adherent to the unified volume listing schema;
observing each attribute of the first container runtime volume listing schema; and
assigning each attribute to an equivalent attribute within the new empty volume listing according to a mapping between the first container runtime volume listing schema and the unified volume listing schema.

3. The method of claim 2, wherein the unified volume listing schema contains an equivalent attribute for each attribute contained in the first container runtime volume listing schema.

4. The method of claim 2, wherein an attribute of the first container runtime volume listing schema comprises an element from the group consisting of: volume name, capacity, file system type, metadata, and mount point.

5. The method of claim 1, wherein the shared unified volume listing is shared among multiple container runtimes, and wherein the multiple container runtimes are mutually exclusive.

6. The method of claim 1, wherein access to the shared unified volume listing is synchronized through a distributed synchronization service.

7. A computer program product for data storage management, the computer program product comprising:
one or more non-transitory computer-readable tangible storage devices and program instructions stored on at least one of the one or more tangible storage devices, the program instructions comprising:
program instructions to receive a request from a first container runtime to create a first container runtime volume;
program instructions to transform volume information of the first container runtime volume from a first container runtime volume listing schema to a unified volume listing schema;
program instructions to create the first container runtime volume within a backend storage;
program instructions to store the unified volume listing schema for the first container runtime volume within a shared unified volume listing;
program instructions to transform the volume information of the first container runtime volume from the unified volume listing schema to the first container runtime volume listing schema;
program instructions to return the volume information of the first container runtime volume to the first container runtime;
program instructions to receive a request from a second container runtime for access to the first container runtime volume by the second container runtime;
program instructions to determine whether the first container runtime volume exists within the shared unified volume listing;
based on determining that the first container runtime volume exists within the shared unified volume listing, program instructions to transform the volume information of the first container runtime volume from the unified volume listing schema to a second container runtime volume listing schema; and
program instructions to returning the volume information of the first container runtime volume to the second container runtime.

8. The computer program product of claim 7, wherein program instructions to transform the volume information of the first container runtime volume from the first container runtime volume listing schema to the unified volume listing schema comprises:
program instructions to create a new empty volume listing adherent to the unified volume listing schema;
program instructions to observe each attribute of the first container runtime volume listing schema; and
program instructions to assign each attribute to an equivalent attribute within the new empty volume listing according to a mapping between the first container runtime volume listing schema and the unified volume listing schema.

9. The computer program product of claim 8, wherein the unified volume listing schema contains an equivalent attribute for each attribute contained in the first container runtime volume listing schema.

10. The computer program product of claim 8, wherein an attribute of the first container runtime volume listing schema comprises an element from the group consisting of: volume name, capacity, file system type, metadata, and mount point.

11. The computer program product of claim 7, wherein the shared unified volume listing is shared among multiple container runtimes, and wherein the multiple container runtimes are mutually exclusive.

12. The computer program product of claim 7, wherein access to the shared unified volume listing is synchronized through a distributed synchronization service.

13. A computer system for data storage management, the computer system comprising:
one or more processors, one or more computer-readable memories, one or more computer-readable tangible storage devices, and program instructions stored on at least one of the one or more tangible storage devices for execution by at least one of the one or more processors via at least one of the one or more memories, the program instructions comprising:
program instructions to receive a request from a first container runtime to create a first container runtime volume;
program instructions to transform volume information of the first container runtime volume from a first container runtime volume listing schema to a unified volume listing schema;
program instructions to create the first container runtime volume within a backend storage;
program instructions to store the unified volume listing schema for the first container runtime volume within a shared unified volume listing;
program instructions to transform the volume information of the first container runtime volume from the unified volume listing schema to the first container runtime volume listing schema;
program instructions to return the volume information of the first container runtime volume to the first container runtime;
program instructions to receive a request from a second container runtime for access to the first container runtime volume by the second container runtime;
program instructions to determine whether the first container runtime volume exists within the shared unified volume listing;
based on determining that the first container runtime volume exists within the shared unified volume listing, program instructions to transform the volume information of the first container runtime volume from the unified volume listing schema to a second container runtime volume listing schema; and program instructions to returning the volume information of the first container runtime volume to the second container runtime.

14. The computer system of claim 13, wherein program instructions to transform the volume information of the first container runtime volume from the first container runtime volume listing schema to the unified volume listing schema comprises:
   program instructions to create a new empty volume listing adherent to the unified volume listing schema;
   program instructions to observe each attribute of the first container runtime volume listing schema; and
   program instructions to assign each attribute to an equivalent attribute within the new empty volume listing according to a mapping between the first container runtime volume listing schema and the unified volume listing schema.

15. The computer system of claim 14, wherein the unified volume listing schema contains an equivalent attribute for each attribute contained in the first container runtime volume listing schema.

16. The computer system of claim 14, wherein an attribute of the first container runtime volume listing schema comprises an element from the group consisting of: volume name, capacity, file system type, metadata, and mount point.

17. The computer system of claim 13, wherein the shared unified volume listing is shared among multiple container runtimes, and wherein the multiple container runtimes are mutually exclusive.

* * * * *